United States Patent [19]
Clough

[11] Patent Number: 5,848,316
[45] Date of Patent: Dec. 8, 1998

[54] METHOD AND APPARATUS FOR EXTRACTING MATERIAL FROM A DISPENSER

[75] Inventor: Arthur H. Clough, Hardwick, Mass.

[73] Assignee: Polaroid Corporation, Cambridge, Mass.

[21] Appl. No.: 829,914

[22] Filed: Mar. 27, 1997

[51] Int. Cl.[6] .................................................. G03D 3/08
[52] U.S. Cl. .................. 396/612; 242/348; 242/332.4; 396/652; 396/210; 396/515; 396/512; 294/1.1
[58] Field of Search .................................. 396/652, 515, 396/210, 612; 226/90, 91; 294/1.1, 34, 99.1; 352/78 R, 235; 242/332.4, 348.3

[56] References Cited

U.S. PATENT DOCUMENTS

| D. 382,003 | 8/1997 | Youngquist | D16/237 |
|---|---|---|---|
| 3,864,993 | 2/1975 | Hovind | 81/488 |
| 4,074,870 | 2/1978 | Kaufman | 294/1.1 |
| 4,113,192 | 9/1978 | Osannai | 242/348 |
| 4,138,068 | 2/1979 | Kinoshita | 242/332.4 |
| 4,572,460 | 2/1986 | Hertrich | 242/332.4 |
| 4,653,789 | 3/1987 | McWilliams et al. | 294/1.1 |
| 4,860,037 | 8/1989 | Harvey | 396/210 |
| 5,255,039 | 10/1993 | Miller | 396/515 |
| 5,381,204 | 1/1995 | Grusetski et al. | 396/652 |
| 5,530,506 | 6/1996 | Zander | 396/512 |

FOREIGN PATENT DOCUMENTS

| 39 162234 A1 | 11/1990 | Germany . |
|---|---|---|
| 04366482 | 12/1992 | Japan . |

*Primary Examiner*—D. Rutledge
*Attorney, Agent, or Firm*—Leslie Payne

[57] ABSTRACT

A film leader extractor comprises, in accordance with a first embodiment of the invention, a structural stiffener component or member having a static-cling vinyl component or member laminated thereto by a suitable adhesive. When the extractor is inserted into, for example a 35 mm photographic film cartridge or canister, the static-cling vinyl layer is temporarily bonded to the film leader by electostatic attraction properties whereby the film leader is then able to be extracted or withdrawn from the film canister. In accordance with a second embodiment of the invention, a tab member is adhesively bonded to the film leader. The tab member is provided with an enlarged aperture to be engaged with a hook-type extractor implement.

20 Claims, 2 Drawing Sheets

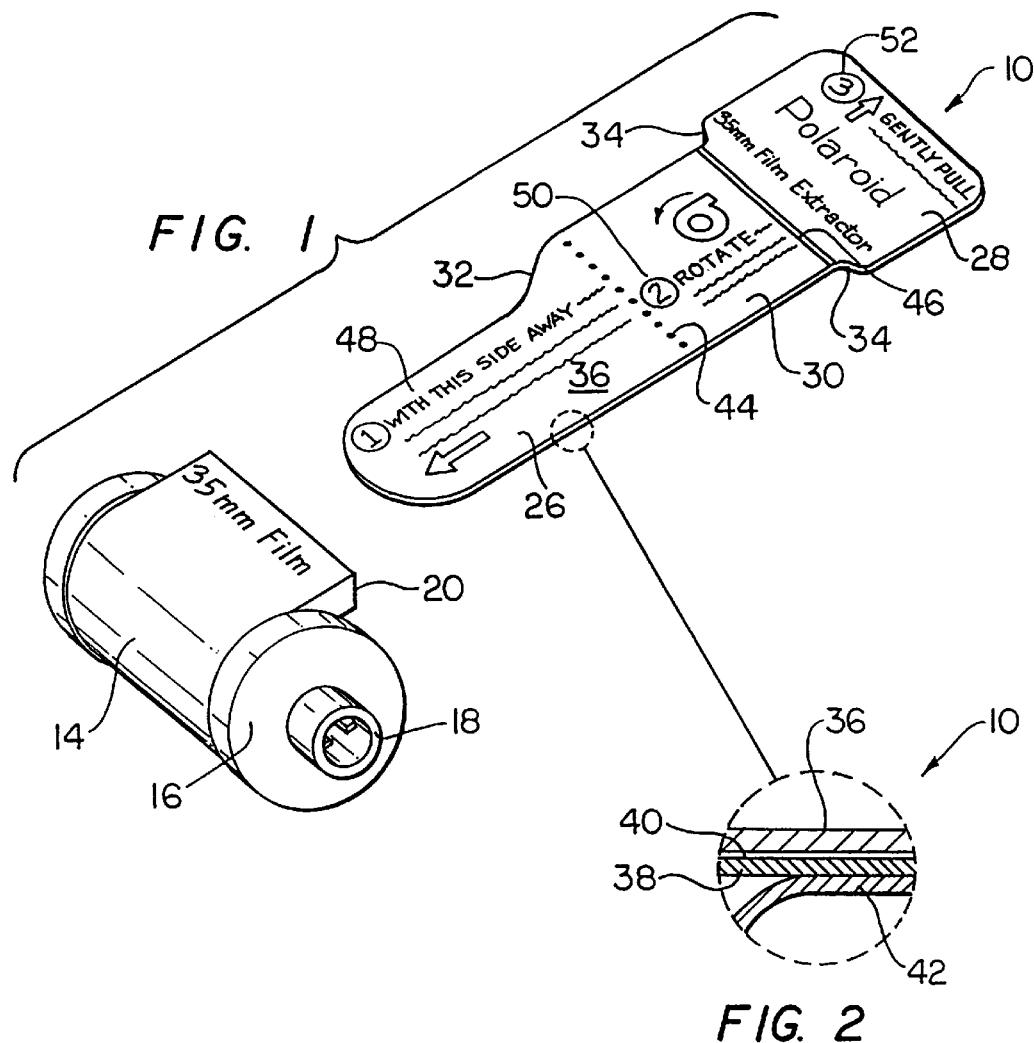
FIG. 1
FIG. 2
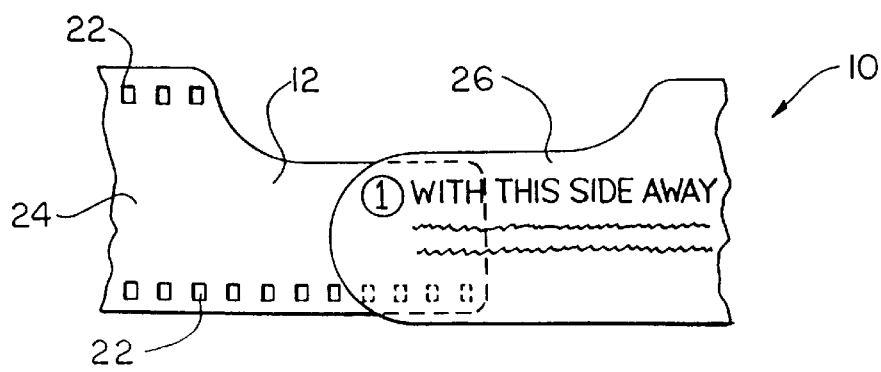
FIG. 3

METHOD AND APPARATUS FOR EXTRACTING MATERIAL FROM A DISPENSER

BACKGROUND OF THE INVENTION

The present invention relates generally to extracting methods and apparatus for dispensers and, in particular, to extracting apparatus and methods for extracting or withdrawing a film leader from a film cassette or cartridge so as not to undesirably expose the film to ambient light, whereby the film may then be readied for developing and processing.

Conventional 35 mm photographic film cassettes or cartridges utilized within standard 35 mm cameras comprise substantially cylindrical casings or housings which are closed at both ends but have a longitudinally extending slot or film withdrawal port, forming a passageway for moving the film into and out of the film cassette or cartridge, defined within a tangential portion of the film cassette or cartridge. Prior to use of the film within the camera, a film leader projects outwardly from the cassette or cartridge through the film withdrawal port so as to enable a user or photographer to properly load the film cassette or cartridge within the camera and operatively connect the film disposed within the cassette or cartridge to the camera take-up spools so that the film may be properly advanced for exposure of the individual film frames. Upon completion of the roll of film, that is, when all of the film frames have been exposed and have images photographed thereon, the film is completely rewound into the cassette or cartridge, removed from the camera, and is ready for subsequent developing and processing. However, since the film leader has also now been rewound into the film cassette or cartridge, it is difficult to withdraw the film from the film cassette or cartridge, in order to develop and process the same, without opening the film cassette or cartridge, and thereby risking exposure of the film to ambient light, or even destroying the film cassette or cartridge and the film disposed therein.

Various prior art devices or implements have therefore been developed in an effort to address the aforenoted need in the art, however, such devices or implements have not been entirely satisfactory for one reason or another. For example, U.S. Pat. No. 4,138,068, issued to Kinoshita on Feb. 6, 1979, and U.S. Pat. No. 4,113,192 issued to Osanai on Sep. 12, 1978, disclose devices or implements for withdrawing the leading end portions of rolls of film from their associated cassettes or cartridges, however, such devices or implements require the use of hook members for operatively engaging the sprocket perforations provided along the edge portions of the film leader. This has proven to be somewhat difficult and tedious due to the small size of the sprocket perforations.

U.S. Pat. No. 4,074,870 issued to Kaufman on Feb. 21, 1978 also discloses a film retrieval device for retrieving or withdrawing the leading end portion of a roll of film from its film cassette or cartridge, however, this device is somewhat complex in that the same comprises the use of first and second, upper and lower flexible members or material strips which form two cooperating tongue members for, in effect, capturing the film leader therebetween whereupon the film leader can be withdrawn from the cassette or cartridge.

U.S. Pat. No. 3,864,993 issued to Hovind on Feb. 11, 1975 discloses a film retriever for retrieving or withdrawing a leading end portion of a film from a film cassette or cartridge, however, this particular device or implement utilizes a tacky adhesive to adhere itself to the film leader disposed within the film cassette or cartridge. The adhesive, however, over a period of time and through use of the implement, tends to attract lint or similar matter which reduces the adhesive properties and utility of the implement, or alternatively, in order to maintain the adhesive properties and utility of the implement, the same has to be cleaned periodically.

Lastly, leader portions of film have also had apertures punched therein during manufacture of the film whereby hook-type implements, similar to those disclosed within the Kinoshita and Osanai patents noted above, can be used to withdraw the film leader portions from the film cassettes or cartridges. While this implement system has proven to be an improvement with respect to the systems of Kinoshita and Osanai in that it has been easier to engage the hook-type implement with the film leader aperture in view of the fact that such aperture has been made larger than the conventional sprocket holes of the film, not all film manufacturers fabricate their film with such punched apertures. Consequently, such hook-type implements can only be used with those films manufactured by a particular manufacturer or a limited group of manufacturers who in fact provide such punched apertures within the film leaders.

A need has therefore existed for quite some time in the art for a means or implement which can simply and reliably withdraw or retrieve a film leader portion of a roll of film from a film cassette or cartridge, in order to ready the exposed roll of film for developing and processing, without the various drawbacks characteristic of the prior art devices or implements as noted hereinabove, and wherein the particular means or implement can be utilized in conjunction with all films regardless of the particular film manufacturer.

OBJECTS OF THE INVENTION

It is therefore an object of the present invention to provide a new and improved film extractor or implement for extracting or withdrawing a film leader or leading end portion of an exposed film from a film cartridge or cassette so as to facilitate initiation of the film developing process.

It is another object of the present invention to provide a new and improved film extractor or implement for extracting or withdrawing a film leader or leading end portion of an exposed film from a film cartridge or cassette which overcomes the various disadvantages characteristic of the prior art film leader extracting or retrieving devices or implements.

It is a further object of the present invention to provide a new and improved film extractor or implement for extracting or withdrawing a film leader or leading end portion of an exposed film from a film cartridge or cassette which is relatively simple in structure, relatively inexpensive to manufacture, simple and easy to use, and can be used with all films regardless of the film manufacturer.

SUMMARY OF THE INVENTION

The foregoing and other objects are achieved in accordance with the present invention through the provision of a method of and an apparatus for displacing a portion of a member from a holder thereof by means for carrying an electrostatic charge thereon which when engaging the portion adheres or bonds electrostatically thereto with sufficient force to allow displacing the portion from the holder.

In accordance with the principles of the present invention, another embodiment of such an apparatus includes an extractor or implement which comprises a structural stiffener to which a layer of static-cling vinyl has been adhered.

When the implement or extractor is inserted through a film withdrawal port defined within the sidewall portion of the film cassette or cartridge containing rolled film, the static-cling vinyl may adhere to a leading end portion of the film. Withdrawal of the film leader extractor or implement out through the film withdrawal port of the film cassette or cartridge effectively entrains the film leader along with the extractor or implement such that the film leader is in fact drawn or pulled out from the film cartridge or cassette as desired. If the static-cling vinyl does not engage the leader, but one of the winds of film, underneath the leader, then pushing on the film wind will force a distal end of the film leader from the film withdrawal port.

In accordance with another embodiment of the present invention, a tab, having an aperture defined therein, also has an adhesive strip disposed thereon so as to permit such tab to be adhesively secured to the film leader. A hook-type implement or extractor may then be used in conjunction with such tab adhesively secured to the film leader so as to engage the aperture defined within the tab and thereby withdraw the film leader out through the film withdrawal port of the film cassette or cartridge. The tab is intended to be applied to the film leader by the consumer prior to insertion or loading of the film cassette or cartridge within the camera, and therefore, the apertured tab can be utilized in conjunction with any film cassette or cartridge manufactured or produced by any film manufacturer.

BRIEF DESCRIPTION OF THE DRAWINGS

Various other objects, features and attendant advantages of the present invention will be more fully appreciated from the following detailed description when considered in connection with the accompanying drawings in which like reference characters designate like or corresponding parts throughout the several views, and wherein:

FIG. 1 is an exploded perspective view of a first embodiment of a new and improved static-cling vinyl film extractor implement constructed in accordance with the principles of the present invention and showing the same being used in conjunction with a conventional photographic film cassette, canister, or cartridge in order to extract or withdraw a film leader portion of, for example, the 35 mm or APS film out from the cassette, cartridge, or canister;

FIG. 2 is an enlarged cross-sectional view of the circled portion of the first embodiment of the film extractor implement of the present invention as shown in FIG. 1;

FIG. 3 is a partial plan view of the first embodiment of the film extractor implement of the present invention, as shown fully in FIG. 1, engaged with the film leader of the APS or 35 mm film, in accordance with the static-cling operative principles of the present invention, so as to withdraw the film leader from the film cartridge, canister or cassette;

DETAILED DESCRIPTION OF THE ILLUSTRATED EMBODIMENTS

Figure 4:
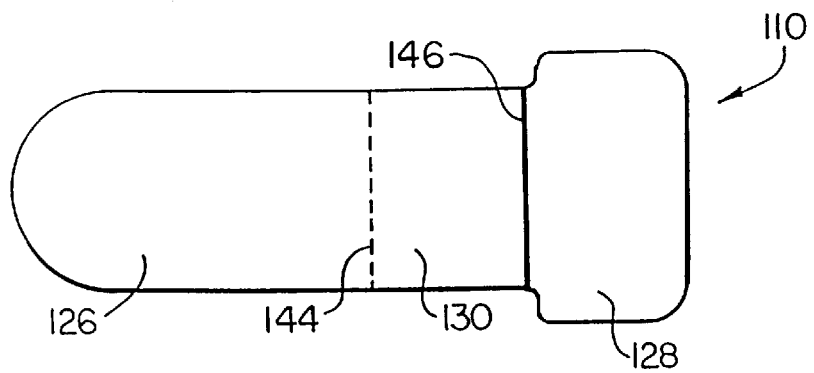
FIG. 4 is a plan view of a modified embodiment of the new and improved static-cling vinyl film extractor implement constructed in accordance with the principles of the present invention.

Referring now to the drawings, and more particularly to FIGS. 1–3 thereof, a first embodiment of a new and improved static-cling vinyl photographic film extractor or implement constructed in accordance with the principles of the present invention is generally indicated by the reference character 10. The extractor or implement 10 is adapted to be used to withdraw or extract a film leader portion 12 of a conventional photographic film, such as 35 mm, APS or the like, which has been coiled or re-wound within a conventional photographic film cassette, cartridge, or canister 14, such as a 35 mm cassette after the roll of photographic film has been used, that is, after all of the film frames have been exposed and have images photographed thereon, so as to prepare or ready the photographic film for processing and development. As is known, a typical or conventional 35 mm photographic film cassette, cartridge, or canister 14 is generally cylindrical in configuration, is provided with closed ends 16, only one of which is disclosed in FIG. 1, and the photographic film is coiled or wound upon a film spool 18 which is rotatable about the axis of the cassette or canister 14 and has at least one end thereof projecting outwardly through one of the ends 16 of the cassette or canister 14 so as to be externally accessible. An axially extending channel member 20 is integral with a peripheral sidewall portion of the cartridge or canister 14 and extends substantially tangentially outwardly with respect to the cartridge or cassette 14. The channel member 20 serves to define a film withdrawal port through which the photographic film is conveyed when the photographic film is being unwound from the film spool 18 or rewound onto the film spool 18. The photographic film is of course conveyed within the camera, either in the unwinding direction or in the rewinding direction, by means of a suitable sprocket drive mechanism which opera-tively engages sprocket holes or apertures 22 defined within opposite side edge portions of the film 24.

As can be particularly seen or appreciated from FIG. 1, the film extractor or implement 10 in accordance with the first embodiment of the present invention comprises an elongate, flat member which includes a tongue portion 26 formed at a first proximal end of the extractor or implement 10, a manipulative handle portion 28 formed at a second, opposite distal end thereof, and an intermediate body portion 30 interposed between and integrally interconnecting the tongue portion 26 and the handle portion 28. The extractor or implement 10 may have an overall length dimension of between three-and-one-half inches and four-and-one-half inches, and it is seen that the handle portion 28 has a greater width dimension than that of the body portion 30 which, in turn, has a greater width dimension than that of the tongue portion 26. The handle portion 28 may have a width dimension of between one-and-one-half inches and two-and-one-half inches, and it is appreciated, as best seen from FIG. 3, that the width dimension of the tongue portion 26 of the implement or extractor 10 is substantially the same as that of the film leader 12. A transitional portion 32 smoothly interconnects the tongue and body portions 26,30, while stepped or shoulder regions 34 smoothly interconnect the body and handle portions 30,28.

With particular reference being made to FIG. 2, the structural composition or make-up of the film extractor implement 10 is disclosed. In particular, the implement 10 is seen to comprise an upper structural stiffener member or component 36 and a lower static-cling vinyl member or component 38. The upper surface portion of the static-cling vinyl member or layer 38 is bonded to the lower or undersurface portion of the upper stiffener member or component 36 by means of a suitable adhesive 40 which will not adversely affect the static charge or static-cling properties of the static-cling component or layer 38. The upper structural stiffener member or component 36 may comprise suitable paper stock, such as, for example, paper stock similar to that from which conventional index cards are fabricated, or alternatively, cardboard. The thickness of the stiffener component may be approximately 0.004–0.008 inches and the upper surface portion thereof is provided with low-frictional surface characteristics so as to smoothly engage the inner peripheral wall surfaces of the film cassette or cartridge 14 when the tongue and body portions 26,30 of the implement 10 are inserted into the film cassette or canister 14 through means of the film withdrawal port defined within the canister channel member 20. Alternatively, in lieu of paper stock material, the stiffener member or component 36 can be fabricated from suitable plastic sheet materials, such as, for example, polyester; rigid vinyl or polycarbonates,such as LEXAN® polycarbonate sheets.

The lower static-cling vinyl member or component 38 is fabricated from suitable, conventional static-cling vinyl materials. It will be understood that as used in the present specification and claims the term static-cling vinyl material refers to a broad category of materials which carrying an electrostatic charge and which are capable of being electrostatically laminated, bonded or adhered to a material which can be attracted to a statically charged member. Such materials need not be made from vinyl, but can be made from any suitable material which will provide the electrostatic forces necessary to effect an electrostatic bonding, adherence or lamination. In this particular embodiment, the so-called static-cling vinyl member or component 38 is fabricated so as to exhibit black opaque properties so as to effectively prevent the transmission of light, or lightpiping, into the film cassette or canister 14 when the tongue and body portions 26,30 of the extractor or implement 10 are introduced or inserted into the cassette or canister 14 through means of the film withdrawal port of channel member 20. In addition, the structural stiffener member is also opaque. The static-cling vinyl member or layer 38 may have a thickness dimension of approximately 0.004–0.008 inches. In order to preserve the static charge and static-cling properties of the static-cling vinyl member or layer 38 of the extractor implement 10, the external, lower or undersurface portion of the static-cling vinyl member or layer 38 is preferably covered by means of a protective paper liner 42. The paper liner 42 is removed by the user or technician prior to use of the ex-tractor or implement 10 in order to extract or withdraw the film leader 12 outwardly from the cartridge or cassette 14 in preparation for development or processing of the film, and the lower or undersurface portion of the paper liner 42 may have written indicia printed thereon to the effect that such liner 42 should be removed before use of the film extractor implement 10. The layer 38 also has low-friction characteristics relative to the plush velvet liner (not shown) in order to facilitate insertion and removal of the member. The plush velvet liner is usually found adjacent the film withdrawal slot of these kinds of film cassettes.

In using the film extractor or implement 10 of the present invention in order to extract or withdraw a film leader portion 12 of 35 mm film 24 rewound within the film canister or cassette 14, the protective paper liner 42 is initially removed from the underside of the film extractor implement 10.

As viewed in FIG. 1, the film spool 18 is then rotated several revolutions in the counter-clockwise direction so as to ensure that the roll of film disposed within the cartridge or canister 14 is fully and substantially tightly rewound thereby allowing the extractor to be inserted between the rolled film and an inside wall of the cannister without encountering excessive resistance. The upper external surface of the extractor stiffener member or layer 36 is provided with a printed dotted line 44 which extends transversely across the extractor or implement 10 and is located within the vicinity of the transitional or interface portion 32 interconnecting the tongue and body portions 26,30 of the implement or extractor 10. In addition, the upper external surface of the extractor stiffener member or layer 36 is also provided with a printed solid line 46 which extends transversely across the extractor or implement 10 so as to be disposed parallel to the dotted line 44 and is located within the vicinity of the stepped or shoulder regions 34 interconnecting the body and handle portions 30,28 of the implement or extractor 10.

After the aforenoted rotation of the film cartridge spool 18 in the counter-clockwise direction, the film extractor implement 10 is grasped by the handle portion 28 thereof and the tongue portion 26 of the film implement or extractor 10 is slowly inserted into the film withdrawal port of the channel member 20 until the dotted line indicia 44 is disposed at the film withdrawal port. The film cartridge spool 18 is then slowly rotated further in the counter-clockwise direction. The disposition of that portion the static-cling vinyl member or layer 38 of the extractor or implement 10 which is now disposed adjacent to the film leader 12 results in the static-cling vinyl member or layer 38 of the extractor or implement 10 being attracted to the film leader 12 whereby a temporary bond is developed between the static-cling vinyl member or layer 38 and the film leader 12.

Consequently, as a result of the further slow rotation of the film cartridge spool 18 in the counter-clockwise direction, the film extractor or implement 10 is drawn further into the film cassette or cartridge 14 until the solid line indicia 46 is disposed at the film withdrawal port. The entrainment of the film extractor implement 10 into the film cassette or cartridge 14 by means of the rotation of the spool 18, as manifested by the aforenoted movement of the extractor or implement between the dotted and solid line portions 44,46 thereof, indicates to the user or technician that the film extractor or implement 10 has in fact been attracted to and bonded with the film leader 12. Subsequently, movement of the film extractor or implement 10 in the direction leading away from the film cartridge or canister 14 will permit the film leader 12 to be entrained with the film extractor or implement 10 and thereby withdrawn from the film cartridge or canister 14 whereby the user or technician can grasp the film leader 12 in preparation for development and processing of the film 24.

It is to be noted that occasionally, when the tongue portion 26 of the film extractor or implement 10 is inserted into film withdrawal port of channel member 20 of the film cartridge or cassette 14 in order to initiate the aforenoted static-cling or electrostatic bonding or adhering between the static-cling vinyl layer or member 38 of the implement 10 and the film leader 12, the static-cling vinyl layer or member 38 of the implement 10 will not in fact encounter the film leader portion 12 of the film 24 but in fact will encounter the next coiled or wound layer of the film per se 24.

Under either one of these operational circumstances, the user or technician will simply restart the film leader extraction procedure. In the first instance, when resistance to further entry of the tongue portion 26 of the extractor implement 10 into the film cassette or cartridge 14 is encountered, this would indicate necessity to wind the spool additional turns counter-clockwise. The technician or user will slowly move the film extractor or implement in the opposite direction, that is, away from the film canister 14 so as to in effect sever any static-cling attraction or bond developed between the static-cling vinyl layer or member 38 of the extractor 10 and the photographic film 14. In the second instance, when resistance to further withdrawal movement of tongue or body portion 26,30 of the extractor implement 10 out from the film cassette or canister 14 is encountered, the user or technician will then continue to slowly move the film extractor or implement 10 in the direction away from the film cassette or canister 14 so as to, in effect, again sever the static-cling attractive bond developed between the static-cling vinyl layer or member 38 of the film extractor implement 10 and the photographic film 24. The entire withdrawal procedure, commencing with the rotation of the film cassette spool 18 in the counter-clockwise direction for several revolutions, can then be repeated. It has been experienced that the film leader extraction method of the present invention will be able to be successfully performed, that is, the film extractor or implement will be statically attracted to and bonded with the film leader 12 of the film 24, and not to the film 24 per se, approximately 80–90% of the time whereby repetition of the film leader withdrawal or extraction process, as noted above, will not be necessary.

It is additionally noted with reference being made to FIG. 1 that instructions embodying the method of using the film extractor or implement 10 of the present invention can be imprinted upon the upper surface portion of the stiffener member or layer 36. For example, the tongue portion 26 of the extractor implement 10 may have instructions, comprising step (1) of the process or method, printed thereon as denoted at 48. Such instructional step might briefly state, for example, "With this side away from the film spool, insert into the film canister up to the dotted line", and may be accompanied by a pictorial arrow oriented in the insertion direction. Similarly, body portion 30 of the film extractor 10 may have instructions, comprising step (2) of the process or method, pre-printed thereon as denoted at 50. Such instructional step may comprise pictorial indicia of the film cartridge or cassette 14, along with an arcuate arrow denoting rotation in the counter-clockwise direction, and the brief statement "Rotate spool slowly counter-clockwise until the solid line reaches the edge of the canister opening, and stop". Lastly, handle portion 28 of the film extractor 10 may have instructions, comprising step (3) of the process or method, printed thereon as denoted at 52. Such instructional step may comprise a pictorial arrow oriented in the withdrawal direction, accompanied by the instructional statement "Gently pull extractor out just far enough to allow film leader to be grasped". Alternate instructions may be used, for instance: rotate spool counter-clockwise several turns; insert extractor to solid line; withdraw slowly and gently to withdraw.

Referring now to FIG. 4 of the drawings, a modified version of the static-cling vinyl film leader extractor or implement is shown and is denoted by the reference character 110, and it is noted that parts of this extractor or implement 110 which are similar to corresponding parts of the extractor or implement 10 of FIGS. 1–3 will be denoted by similar reference characters except that such characters will be in the 100 series. More particularly, it is noted that this version or modified embodiment of the static-cling vinyl film leader extractor or implement 110 is precisely the same in all respects as that of the first embodiment of the static-cling vinyl film leader extractor or implement 10 of FIGS. 1–3 except for the fact that the width dimensions of the tongue and body portions 126,130 are substantially the same such that the transitional region or portion 32 of the film extractor or implement 10 has in effect been eliminated.

Figure 5:
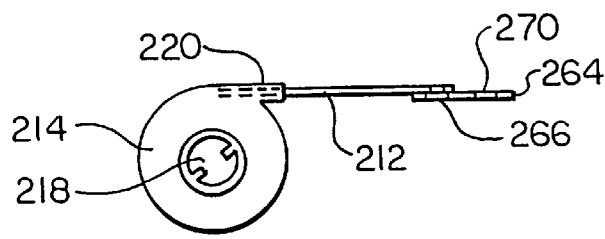
FIG. 5 is a side elevation view of a 35 mm film canister, cartridge, or cassette having an apertured stick-on tab, comprising one operative component of a second embodiment of a new and improved film extractor system constructed in accordance with principles of the present invention, adhered to the underside or emulsion side of the film leader of the 35 mm film with the film leader initially projecting or disposed outwardly from the film cartridge, cassette, or canister.
Figure 6:
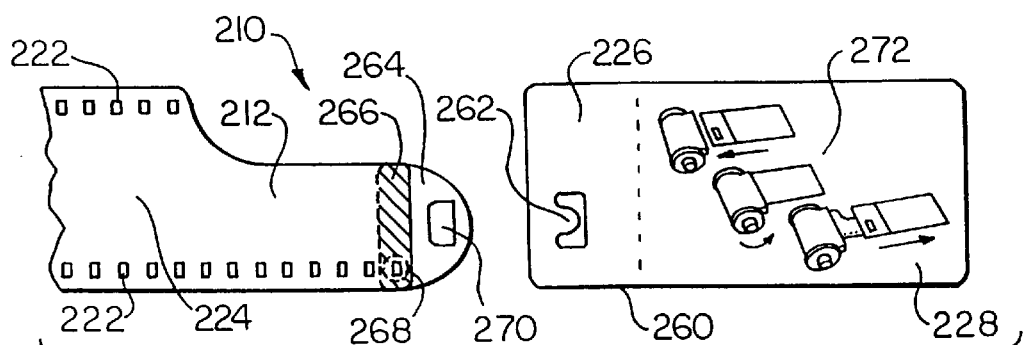
FIG. 6 is a partial plan view similar to that of FIG. 3 and showing the two components of the second embodiment of the new and improved film extractor system constructed in accordance with the principles of the present invention wherein the hooked implement or extractor tool is juxtaposed to the film leader having the apertured stick-on tab adhered thereto so as to be ready to engage the aperture of the stick-on tab whereby the film leader can be withdrawn or extracted from the film cassette, cartridge, or canister.
Figure 7:
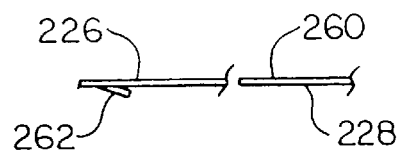
FIG. 7 is a side elevational view showing the hooked implement or extractor tool shown in FIG. 6.

With reference lastly being made to FIGS. 5–7, a second embodiment of a film leader extractor system is disclosed and is denoted by the reference character 210. Again, all parts of such system 210 which correspond to similar parts or components of the previous systems or implements 10 and 110 are again denoted by similar reference characters except that such reference characters will now be in the 200 series.

As an alternative to the static-cling type extractor system 10 or 110 of the previously noted embodiments, the embodiment of this system 210 comprises the use of a hook-type extractor or implement 260. As was noted previously, prior art hook-type extractor implements are in fact known, however, such conventional implements are adapted to be used to extract film leader portions of the photographic film disposed within the film cassette or canister by engaging the sprocket hole apertures of the film leader which sometimes proves to be somewhat difficult and tedious. It has also been noted that film leader portions of photographic film manufactured by particular manufacturers have had relatively large apertures punched therein so as to facilitate the hooked engagement by the hook-type extractor implements, however, this manufacturing technique has not been universally adopted. Consequently, when dealing with a particular film cartridge or cassette manufactured by a particular manufacturer which has not adopted this practice of providing such relatively large apertures within the film leader portion of the photographic film, the user or technician is relegated to using the conventional hook-type implements to engage the sprocket hole apertures of the film leader.

The film leader extractor system 210 of the present invention is therefore particularly intended to be universally adaptable to all 35 mm film cassettes or cartridges regardless of the particular manufacturer. Accordingly, in accordance with this embodiment or system of the present invention, the film extractor or implement 260 is seen to essentially comprise a film cassette insertion portion 226 and a manipulative handle portion 228. The implement or extractor 260 may be fabricated from stainless steel and may have a thickness dimension of approximately 0.008 inches. A hook-type projection 262 is punched out from an area of the film cassette insertion portion 226 so as to project or extend out of the plane of the implement 260 as best seen in FIG. 7.

In order to render the film extractor or implement 260 universally useable with all 35 mm photographic film cartridges or cassettes, a tab member 264 is adapted to be mounted upon the film leader 212 of the photographic film 224 by the camera user or photographer prior to insertion of the 35 mm cassette or canister 214 within the camera. The tab member 264 is preferably fabricated from a suitable polyester and may have a thickness dimension of approximately four mils. The tab member 264 is adapted to be bonded to underside or emulsion side of the photographic film 224, and in order to achieve such bonding of the tab member 264 to the photographic film leader 212, the tab member 264 is provided with a transversely extending adhesive strip 266 which may have a removable paper liner disposed thereon so as to preserve the adhesive properties thereof until the tab member 264 is mounted upon the film leader 212. The tab member 264 is provided with an aperture 268 within a side edge portion of the adhesive strip 266 so as not to interfere with the overlying sprocket hole 222 of the film leader 212, and is also provided with an aperture 270, at a central portion thereof which is aligned with a longitudinal axial portion of the film leader 212, which is adapted to be engaged by the hook member 262 of the film implement or extractor 260.

The method of using the film leader extraction system 210 of the present invention is similar to that employed in connection with the film extractor or implement 10 and 110 of FIGS. 1–4. In connection with the system 210 a hooked engagement between the film extractor implement 260 and the photographic film leader 212 is being achieved, whereas in connection with the use of the film extractor or implement 10 or 110, a static-cling or electrostatic bonding or adhering between the implement 10 or 110 and the film leader 12 was achieved. As was similar to the use of the film extractor or implement 10 or 110, the film implement or extractor 260 may have pictorial and/or written printed indicia thereon as denoted at 272 which would provide the user or technician with directions as to how to use the film leader extractor or implement 260 in order to extract or withdraw the film leader 212 from the interior of the film cassette or canister 214. It is also to be noted that if the camera user or photographer neglects or forgets to attach the tab member 264 to the film leader prior to insertion of the film cassette or canister 214 into the camera, then the film implement or extractor 260 cannot be used to extract or withdraw the film 224 from the film cassette or canister 214 and other means or implements must be used. In order to extract a film leader, a leading end portion of the implement 210 is inserted into the cassette film withdrawal slot up to the dotted line appearing thereon. Then the film cassette spool is rotated counter-clockwise until the dotted line is just pulled inside the container; whereupon by virtue of the proximity of the tab aperture and the hook the latter engages the former and the implement is slowly pulled to extract the film.

Thus, it may be seen that in accordance with the film extractor implements and systems of the present invention, means and techniques have been developed and disclosed which are quite simple and expedient to use, and in addition, the use of such implements, systems, and techniques are applicable to withdrawing at least a portion of a member from a holder therefor and, in particular, all photographic film cartridges, cassettes, canisters, or the like, regardless of the particular manufacturer of such photographic products.

Obviously, many modifications and variations of the present invention are possible in light of the above teachings. It is therefore to be understood that within the scope of the appended claims, the present invention may be practiced otherwise than as specifically described herein.

What is claimed as new and desired to be protected by Letters Patent of the United States of America, is:

1. Apparatus for withdrawing a portion of a member from a holder thereof, which portion is attracted to statically charged material, said apparatus comprising: a body; and means on said body for carrying a static charge for electrostatically adhering to the portion with sufficient force for withdrawing the portion from the holder.

2. A film extractor implement for extracting a film leader portion of a photographic film disposed within a photographic film canister, comprising:

a structural stiffener member; and a static-cling vinyl member mounted upon said structural stiffener member for developing a static-cling attraction to a film leader portion of a photographic film, disposed within a photographic film canister, when said film extractor implement is inserted into the photographic film canister so as to temporarily bond with the film leader portion of the photographic film whereby the film leader portion of the photographic film is able to be extracted from the photographic film canister when the film extractor implement is withdrawn from the photographic film canister.

3. The film extractor implement as set forth in claim 2, further comprising:

adhesive means interposed between said structural stiffener member and said static-cling vinyl member for adhesively bonding said static-cling vinyl member to said structural stiffener member.

4. The film extractor implement as set forth in claim 3, further comprising:

removable liner means disposed over said static-cling vinyl member so as to protect the static-cling properties of said static-cling vinyl member prior to use of said film extractor implement for extracting a film leader portion of a photographic film from a photographic film canister.

5. The film extractor implement as set forth in claim 2, wherein:

said structural stiffener member comprises paper stock material.

6. The film extractor implement as set forth in claim 2, wherein:

said structural stiffener member comprises a plastic material.

7. The film extractor implement as set forth in claim 2 wherein:

said static-cling vinyl member has black opaque properties so as to prevent lightpiping of ambient light into the interior of the photographic film canister when said film extractor implement is inserted into the photographic film canister.

8. The film extractor implement as set forth in claim 7 wherein:

said stiffener member has black opaque properties so as to prevent lightpiping of ambient light into the interior of the photographic film cannister.

9. A film extractor component for use with a hook-type film extractor implement for extracting a film leader portion of a photographic film disposed within a photographic film canister, comprising:

a tab member;

means disposed upon said tab member for securing said tab member to a film leader portion of a photographic film disposed within a photographic film canister; and aperture means defined within said tab member for engagement by a hook-type film extractor implement such that when a hook-type film extractor implement is inserted into the photographic film canister, said aperture means of said tab member is able to be engaged by the hook-type film extractor implement whereby the film leader portion of the photographic film disposed within the photographic film canister is able to be extracted from the photographic film canister when the hook-type film extractor implement is withdrawn from the photographic film canister.

10. The film extractor component as set forth in claim 9, wherein:

said means disposed upon said tab member for securing said tab member to the film leader portion of the photographic film comprises an adhesive strip.

11. The film extractor component as set forth in claim 9, wherein:

said tab means comprises a polyester material.

12. The film extractor component as set forth in claim 9, wherein:

said aperture means is defined within a central portion of said tab member for alignment with a longitudinal axial portion of the film leader portion of the photographic film.

13. The film extractor component as set forth in claim 10, wherein:

additional aperture means defined within said adhesive strip for providing access to sprocket holes defined within an edge portion of the film leader portion of the photographic film.

14. A film extractor system for extracting a film leader portion of a photographic film disposed within a photographic film canister, comprising:

a tab member;

means disposed upon said tab member for securing said tab member to a film leader portion of a photographic film disposed within a photographic film canister;

aperture means defined within said tab member; and a film extractor implement having hook means disposed thereon for engagement with said aperture means of said tab member such that when said film extractor implement is inserted into the photographic film canister, said hook means of said film extractor implement can engage said aperture means of said tab member whereby upon withdrawal of said film extractor implement from the photographic film canister, the film leader portion of the photographic film disposed within the photographic film canister can be extracted therefrom.

15. The film extractor system as set forth in claim 14, wherein:

said means disposed upon said tab member for securing said tab member to the film leader portion of the photographic film comprises an adhesive strip.

16. The film extractor system as set forth in claim 14, wherein:

said tab means comprises a polyester material.

17. The film extractor system as set forth in claim 14, wherein:

said aperture means is defined within a central portion of said tab member for alignment with a longitudinal axial portion of the film leader portion of the photographic film.

18. The film extractor system as set forth in claim 14 wherein:

said film extractor implement is fabricated from stainless steel.

19. The film extractor system as set forth in claim 14, wherein;

said film extractor implement comprises a planar member; and said hook means is punched out from said film extractor implement so as to extend out of the plane of said planar film extractor implement.

20. A method of extracting a leading end portion of a coiled photographic film in a cassette having a film withdrawal slot; said method comprising the steps of:

inserting a withdrawing body into the slot such that means thereon for carrying an electrostatic charge is engaged with the film so as to effect an electostatic bonding therebetween with sufficient force to allow extraction of the leading portion by applying a withdrawing force to the withdrawing body.

\* \* \* \* \*